L. E. OLSEN.
ADJUSTABLE LIMIT GAUGE.
APPLICATION FILED JULY 26, 1920.
1,414,434.
Patented May 2, 1922.
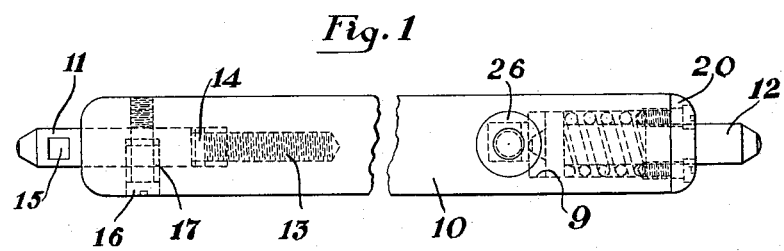
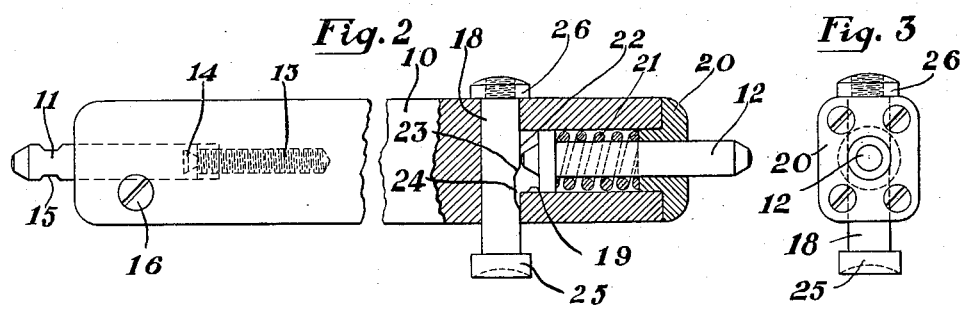 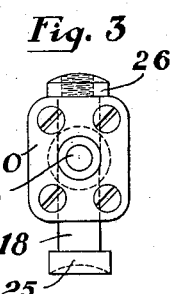
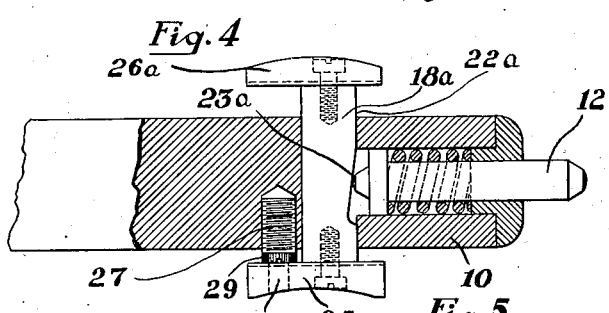
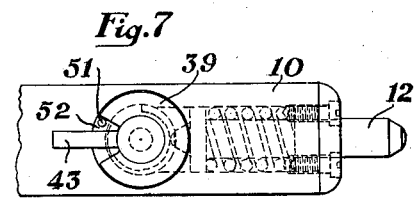
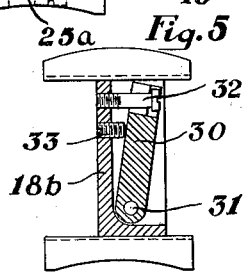 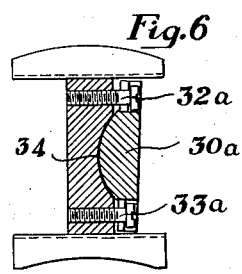
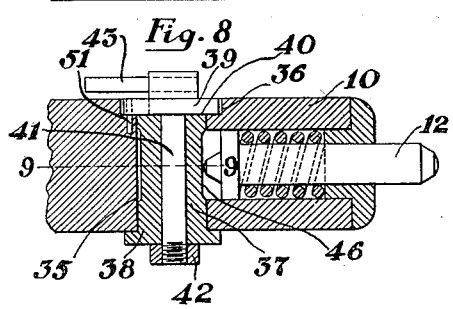 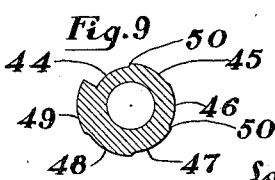
Inventor
Lawrence C. Olsen
By S. Jay Teller
Attorney

UNITED STATES PATENT OFFICE.

LAWRENCE E. OLSEN, OF TROY, NEW YORK, ASSIGNOR TO PRATT & WHITNEY COMPANY, OF NEW YORK, N. Y., A CORPORATION OF NEW JERSEY.

ADJUSTABLE LIMIT GAUGE.

1,414,434. Specification of Letters Patent. Patented May 2, 1922.

Application filed July 26, 1920. Serial No. 398,901.

*To all whom it may concern:*

Be it known that I, LAWRENCE E. OLSEN, a citizen of the United States, residing at Troy, in the county of Rensselaer and State of New York, have invented certain new and useful Improvements in Adjustable Limit Gauges, of which the following is a specification.

This invention relates to a linear gauge and in particular to a pin gauge adapted to be used to determine the dimensions of cylindrical holes or other internal dimensions.

One of the objects of the present invention is to provide a gauge of this type which may be accurately adjusted to a standard dimension and also to a dimension slightly different from the standard dimension.

Another object of the invention is to provide a gauge with easily operated means to change the distance between the contact pins of the gauge from the standard dimension to a dimension slightly different from the standard.

Another object of the invention is to provide an improved gauge with a contact pin at one end which may be initially adjusted and also provided at the opposite end with a pin adapted to be movable a relatively small amount, preferably by movement of a member contained within the gauge.

Another object of the invention is to provide an improved gauge adapted to measure internal dimensions within chosen limits, a slidable contact pin being adapted to move a distance equal to that chosen for the limit above or below the standard dimension.

Another object is to provide an improved gauge for internal dimensions which has two settings, one, a setting for a standard dimension, and the second, a setting for a dimension slightly differing from the standard dimension.

Another object is to provide a gauge for internal dimensions which may be set to a plurality of slightly different dimensions above or below a standard dimension to indicate readings within a plurality of limits.

Another object of the invention is to provide a gauge which will readily indicate to the operator whether it is set for the standard dimension or for the limit dimension slightly different from the standard dimension.

With these and other objects in view, my invention consists in the features of construction and operation set forth in the following specification.

It is to be understood that the present showing discloses but several specific constructions of gauges made in accordance with the present invention and that other constructions differing from these constructions are included within the spirit and scope of the invention as expressed in the appended claims.

In the drawing:

Figure 1 shows a longitudinal view of one embodiment of the present invention.

Fig. 2 is another longitudinal view, partly in section, of the same embodiment of the invention as shown in Fig. 1.

Fig. 3 is an end view of the embodiment of the invention shown in Figs. 1 and 2.

Fig. 4 shows a different embodiment of the invention.

Fig. 5 shows an alternate form of the cross bar shown in Fig. 4.

Fig. 6 shows another alternate form of the cross bar shown in Fig. 4.

Fig. 7 is a fragmentary longitudinal view of another construction adapted to be used for a multiple of limits.

Fig. 8 is another longitudinal view, in section, of the construction shown in Fig. 7.

Fig. 9 is an enlarged view, in section, of the sleeve taken on the line 9—9 of Fig. 7.

As illustrated in the drawing, the invention may be embodied in gauges of several different forms. I have illustrated only gauges adapted for determining internal dimensions for the reason that the invention is particularly applicable to gauges of this type, but it is to be understood that as concerns certain of its features, the invention is not so limited. A gauge embodying the invention comprises a frame and two opposed contact pins at opposite ends of the frame, one pin being freely movable longitudinally through a definite predetermined distance and the other pin preferably being longitudinally adjustable.

Referring more in detail first to the construction shown in Figs. 1 to 3, 10 represents the gauge frame and 11 and 12 represents the two contact pins. When the gauge is intended for determining internal dimensions, the frame extends directly along straight lines from one pin to the other. As illustrated, the frame is a straight bar of substantially rectangular cross section.

The pin 11 is preferably longitudinally adjustable with respect to the frame 10 and a screw 13 is provided for effecting the adjustment. The said screw is threaded into a hole in the frame 10 and is illustrated as having a dovetailed connection 14 with the pin. The pin is flattened at 15 so that it can be readily turned to effect adjustment. For locking the pin in adjusted position, there is provided a clamping screw 16 which engages a bushing 17 and forces it into clamping contact with the pin.

The pin 12 is freely movable longitudinally and a stop is carried by the frame in position to definitely limit the movement of the pin in one direction. Also carried by the frame is a manually operable means for controlling or effecting the movement of the pin in the direction away from the operative position which is determined by the said stop. The gauge is further provided with means for definitely limiting the last said movement of the pin so that it has a second operative position at a definite predetermined distance from the first position. While I do not so limit myself, I prefer and have shown the first said stop, the said manually operable controlling or moving means and the said limiting means all formed integrally and constituting parts of a slide mounted in the frame for definitely limited rectilinear movement transversely of the pin. As illustrated in Figs. 1 to 3, the slide is indicated at 18, it being slidable in a transverse hole in the frame. Preferably both ends of the slide project from the frame.

The pin 12 is mounted in a hole 19 formed in the frame, this hole being closed by an apertured cap 20. A spring 21 is interposed between the cap 20 and a collar on the pin, this spring serving to force the pin inward against the slide 18. The first mentioned stop for limiting the movement of the pin in one direction is formed on the slide at 22; the means for controlling or effecting the movement of the pin away from the operative position determined by the stop 22 is the cam surface 23 together with the spring 21; and the means for definitely limiting the last said movement of the pin is the surface 24 formed on the slide. The movement of the slide 18 is definitely limited and as shown in Figs. 1 to 3 the slide carries separate movable limit stops or heads 25 and 26 which are adapted to directly engage with the sides of the frame. These heads also serve as finger pieces.

In order to prevent confusion to the operator in the use of these gauges, I prefer to make the heads 25 and 26 of different form so that the operator may easily determine for which dimension the gauge is adjusted. In the modification shown in these figures, the head 25 is made concave and the head 26 convex.

The gauge shown in Figs. 1 to 3 is initially constructed or adjusted so that when the pin 12 is in engagement with the stop 22, the distance between the ends of the pins is the maximum permissible dimension of the part to be gaged. It is to be understood, however, that I do not limit myself to a construction in which the initial position of the pin represents the maximum dimension. Obviously it might represent the minimum dimension. When the slide 18 is moved to the position opposite to that shown in Fig. 1, the cam surface 23 in conjunction with the spring 21 causes the pin to move inward, thus separating the pin from the stop 22. The construction is such that the pin is moved inward to a second operative position at a definite predetermined distance from the first position, this second position being determined by the surface 24. With the pin 12 in the said second position, the distance between the ends of the pins 11 and 12 is the minimum permissible dimension of the part to be gaged.

It will be seen that in accordance with my invention, I have provided a limit gauge in which a single pin at one end of the gauge is movable into two different and distinct positions corresponding respectively to the maximum and minimum permissible dimensions. The first position is the "not go" position and the second position is the "go" position. A gauge of this type has distinct advantages over a gauge having two fixed pins at definite positions. Clearly if there were two such fixed pins, the "not go" pin would prevent the "go" pin from entering into a hole except for a certain very limited distance; but with my improved gauge the diameter or dimension of a deep hole can be tried at all parts thereof not only as concerns the permissible minimum but also as concerns the permissible maximum.

Fig. 4 is a fragmentary view of a construction which is in most respects the same as that shown in Figs. 1 to 3. The only difference in the construction is in the transverse slide and the parts associated therewith. The slide is indicated at 18ᵃ it being provided with two limit stops or finger pieces 25ᵃ and 26ᵃ similar respectively to the stops or finger pieces 25 and 26 but preferably somewhat larger. These stops or finger pieces 25ᵃ and 26ᵃ are preferably fastened to the ends of slide or cross bar 18ᵃ by screws as shown, the ends of the slide 18ᵃ entering recesses in stops 25ᵃ and 26ᵃ so that they are held rigidly in position. The slide 18ᵃ is provided with a surface 22ᵃ which serves as a stop to limit the movement of the pin in one direction and it has a cam surface 23ª similar in function to the cam surface 23 of the slide 18. Instead of providing the slide 18ª with a limiting surface such as the surface 24 of the slide 18 I provide a supplemental adjustable stop for limiting the transverse movement of the slide. This stop is in the form of a screw 27 which engages the finger piece 25ª. This finger piece has a hole 28 therein providing access to the screw for purposes of adjustment. Preferably the screw 27 is provided with graduations at 29, these graduations being such as to indicate the extent of movement of the pin 12 when the slide 18ª is moved as far as possible.

It will be seen that the gauge shown in Fig. 4 can be used in the same way as the gauge shown in Figs. 1 to 3 but that it has the additional advantage that the extent of movement of the pin 12 from its first operative position is adjustable so that the pin may occupy a second operative position at any one of a plurality of definite predetermined distances from the first position. If the gauge is initially constructed or adjusted so that the distance between the two pins corresponds to the true or nominal dimension of the part to be gaged then the extent of movement of the movable pin may be varied in accordance with the particular tolerance which may be desired, this variation taking place without disturbing the initial setting.

With the construction shown in Fig. 4 the pin 11 can be adjusted so that the gauge is correct for one of the limiting dimensions when the pin 12 is in its first position. Then without changing this first limiting dimension, the gauge may be adjusted to provide the other limiting dimension, which may be greater or less (shown as less) than the initial dimension.

In Fig. 5 I have shown a construction which is similar to that shown in Fig. 4 except that a slide 18ᵇ is provided with an adjustable cam member 30 which is pivoted to the slide for movement about the axis of a pivot pin 31. The cam member 30 is adjustable by means of two screws 32 and 33 which are mounted to oppose each other. It will be clear that by substituting the slide 18ᵇ and attached parts for the slide 18ª it is possible to vary the extent of pin movement without changing the extent of the slide movement. In other words, it becomes unnecessary to provide an adjustable stop for the slide.

The construction shown in Fig. 6 is similar to that shown in Fig. 5. The cam member 30ª instead of being connected to the slide by means of a pivot pin is provided with an arcuate surface which fits an arcuate seat 34 in the slide. The cam member 30 can be rocked on this arcuate seat 34 by means of two screws 32ª and 33ª.

In Figs. 7 to 9 I have shown a construction in which the mechanism for moving the pin 12 and for limiting the movement thereof is quite different from what is shown in the other figures. In lieu of a transversely movable slide there is provided a pin moving element which is rotatable about a fixed axis. In this construction a cylindrical hole 35 is formed in the frame, this hole being counterbored as shown at 36. Rotatably mounted within the hole 35 is a sleeve 37 having a head 38 which takes up against one side of the frame 10. At the opposite end of the sleeve 38 is a head 39 which fits into the counterbore 36 and engages the sleeve at 40. A screw 41 is formed on the head 39 and extends through the sleeve 37 and is engaged at the other end by a nut 42. This screw and nut serve to hold the head and sleeve in engagement with each other. Carried by the head 39 is a handle 43 whereby the head and the sleeve may be readily turned. As shown most clearly in Fig. 9, the sleeve 37 is formed with a plurality (preferably three or more) of fragmentary concentric cylindrical surfaces 44, 45, 46, 47, 48 and 49 of different radii, these surfaces being connected by short eccentric cam surfaces 50. The inner end of the pin 12 engages one or another of the cylindrical surfaces of the sleeve and it will be seen that when the sleeve is turned the pin is moved inward or outward through a definite distance from one definite position to another definite position. The surfaces 44 to 49 serve as stops for determining the limits of movement of the pin. The distances of movement between each two adjacent surfaces are different, they preferably being successively less as the sleeve is turned or adjusted. For instance, the distance between the surfaces 44 and 45 may be five thousandths of an inch; between the surfaces 45 and 46, four thousandths, etc. Thus by moving the sleeve in opposite directions so that the pin is engaged by the surfaces 44 and 45 the pin is moved to an extent corresponding to a certain predetermined tolerance. By adjusting the sleeve so that the pin is engaged by other surfaces, as, for instance, the surfaces 47 and 48, a lesser movement is effected which corresponds to a lesser predetermined tolerance.

In order that the operator may conveniently move the sleeve and limit the movement so that the pin will be engaged by only two surfaces, I provide an adjustable stop mechanism which includes a screw, which may be the screw 41 already described. As illustrated, there is a stop pin 51 which projects into a notch 52 formed in the head 39. It will be clear that this pin engaging the sides of the notch limits the turning movement of the head and of the sleeve. By loosening the nut 42 on the screw 41 the sleeve may be turned with respect to the head, thus making it possible to bring any two of the surfaces 44 to 49 into operative relation with the pin 12. Then by tightening the nut on the screw the stop is again made operative in a new relative position.

The construction shown in Figs. 7 to 9 is not herein specifically claimed, it being presented in my copending application for adjustable limit gauges, Serial No. 398,902, filed on even date herewith.

What I claim is:

1. A gauge for determining internal dimensions comprising in combination, a frame, an outward projecting contact pin at one end of the frame, an outward projecting contact pin at the other end of the frame and movable inward or outward with respect thereto, the said frame extending directly along straight lines from one pin to the other, and mechanism for moving the movable pin through a definite predetermined distance, the said mechanism having a cam surface engaging the pin and having two separate limit stops held in fixed relation to each other and with their active faces adjacent.

2. A gauge for determining internal dimensions comprising in combination, a frame, an outward projecting contact pin at one end of the frame, an outward projecting contact pin at the other end of the frame and movable inward or outward with respect thereto, the said frame extending directly along straight lines from one pin to the other, means for moving the movable pin through a definite predetermined distance comprising a manually movable slide mounted in the frame for definitely limited rectilinear movement transversely of the pin and provided with an inclined cam surface directly engaging the pin, and a spring for holding the pin in engagement with the slide.

3. A gauge for determining internal dimensions comprising in combination, a frame, an outward projecting contact pin at one end of the frame, an outward projecting contact pin at the other end of the frame and movable inward or outward with respect thereto, the said frame extending directly along straight lines from one pin to the other, means for moving the movable pin through a definite predetermined distance comprising a manually movable slide mounted in the frame for definitely limited rectilinear movement transversely of the pin and provided with an inclined cam surface directly engaging the pin, the said slide extending entirely through the frame and being adapted for manual engagement at each end, and a spring for holding the pin in engagement with the slide.

4. A gauge for determining internal dimensions comprising in combination, a frame, an outward projecting contact pin at one end of the frame, an outward projecting contact pin at the other end of the frame and movable inward or outward with respect thereto, the said frame extending directly along straight lines from one pin to the other, means for moving the movable pin through a definite predetermined distance comprising a manually movable slide mounted in the frame for definitely limited rectilinear movement transversely of the pin and provided with an inclined cam surface directly engaging the pin, the said slide extending entirely through the frame and being adapted for manual engagement at each end, differently shaped finger pieces at opposite ends of the slide, and a spring for holding the pin in engagement with the slide.

5. A gauge for determining internal dimensions comprising in combination, a frame, an outward projecting contact pin at one end of the frame, an outward projecting contact pin at the other end of the frame and movable inward or outward with respect thereto, the said frame extending directly along straight lines from one pin to the other, a stop on the frame directly engaging the movable pin and having a fixed operative position, the said stop serving to definitely limit the movement of the pin in one direction so that it has a definite predetermined operative position, manually controllable means carried by the frame for moving the last said pin in the direction away from the said operative position, the said pin and stop being thus separated, and means for definitely limiting the last said movement of the pin so that it has a second operative position at a definite predetermined distance from the first position.

6. A gauge for determining internal dimensions comprising in combination, a frame, an outward projecting contact pin at one end of the frame, an outward projecting contact pin at the other end of the frame and movable inward or outward with respect thereto, the said frame extending directly along straight lines from one pin to the other, a stop on the frame directly engaging the extreme inner end of the movable pin and having a fixed operative position, the said stop serving to definitely limit the inward movement of the pin so that it has a definite predetermined operative position, manually operable means carried by the frame for moving the last said pin in the direction away from the said operative position, the said pin and stop being thus separated, and means for definitely limiting the last said movement of the pin so that it has a second operative position at a definite predetermined distance from the first position.

7. A gauge for determining internal dimensions comprising in combination, a frame, an outward projecting contact pin at one end of the frame, means for adjusting the said pin and locking it in adjusted position, an outward projecting contact pin at the other end of the frame and movable inward or outward with respect thereto, the said frame extending along straight lines from one pin to the other, a stop on the frame directly engaging the movable pin and having a fixed operative position, the said stop serving to definitely limit the movement of the pin in one direction so that it has a definite predetermined operative position, manually operable means carried by the frame for moving the last said pin in the direction away from the said operative position, the said pin and stop being thus separated, and means for definitely limiting the last said movement of the pin so that it has a second operative position at a definite predetermined distance from the first position.

8. A gauge for determining internal dimensions comprising in combination, a frame, an outward projecting contact pin at one end of the frame, an outward projecting contact pin at the other end of the frame and movable inward or outward with respect thereto, the said frame extending directly along straight lines from one pin to the other, means for moving the movable pin through a definite predetermined distance comprising a manually movable slide mounted in the frame for definitely limited rectilinear movement transversely of the pin and provided with an inclined cam surface directly engaging the pin, means for varying the said predetermined distance of pin movement, and a spring for holding the pin in engagement with the slide.

9. A gauge for determining internal dimensions comprising in combination, a frame, a contact pin projecting outward at one end of the frame, a contact pin projecting outward at the other end of the frame and movable inward or outward with respect thereto, adjustable stop mechanism including a screw and serving to determine an operative position of the movable pin, and means on the frame operable independently of the said screw for moving the movable pin away from the position determined by the stop mechanism.

10. A gauge for determining internal dimensions comprising in combination, a frame, a contact pin projecting outward at one end of the frame, means for adjusting the said pin and locking it in adjusted position, a contact pin projecting outward at the other end of the frame and movable inward or outward with respect thereto, adjustable stop mechanism including a screw and serving to determine an operative position of the movable pin, and means on the frame operable independently of the said screw for moving the movable pin away from the position determined by the stop mechanism.

11. A gauge for determining dimensions comprising in combination, a frame, a contact pin at one end of the frame, a contact pin at the other end of the frame and movable inward or outward with respect thereto, an adjustable screw associated with the movable pin and serving to determine an operative position of the said pin, means on the frame supplemental to the screw for moving the pin away from the position determined by the screw, and means independent of the screw for definitely limiting the last said movement.

12. A gauge for determining dimensions comprising in combination, a frame, a contact pin at one end of the frame, a contact pin at the other end of the frame and movable inward or outward with respect thereto, means for definitely limiting the movement of the movable pin in one direction so that it has a definite predetermined operative position, manually operable means carried by the frame for moving the last said pin in the direction away from the said operative position, and means for definitely limiting the last said movement of the pin, the said means being adjustable independently of the first said limiting means so that the pin has a second operative position at any one of a plurality of definite predetermined distances from the first position.

13. A gauge for determining dimensions comprising in combination, a frame, a contact pin at one end of the frame, a contact pin at the other end of the frame and movable inward or outward with respect thereto, means for definitely limiting the movement of the movable pin in one direction so that it has a definite predetermined operative position, manually operable means carried by the frame for moving the last said pin in the direction away from the said operative position, and means for definitely limiting the last said movement of the pin, the said means including a screw stop adjustable independently of the first said limiting means so that the pin has a second operative position at any one of a plurality of definite predetermined distances from the first position.

14. A gauge for determining dimensions comprising in combination, a frame, a contact pin at one end of the frame, a contact pin at the other end of the frame and movable inward or outward with respect thereto, means for definitely limiting the movement of the movable pin in one direction so that is has a definite predetermined operative position, manually operable means carried by the frame for moving the last said pin in the direction away from the said operative position, means for definitely limiting the last said movement of the pin, the said means being adjustable independently of the first said limiting means so that the pin has a second operative position at any one of a plurality of definite predetermined distances from the first position, and means for visually indicating the extent of movement of the last said pin.

15. A gauge for determining dimensions comprising in combination, a frame, a contact pin at one end of the frame, a contact pin at the other end of the frame and movable inward or outward with respect thereto, a stop on the frame directly engaging the movable pin and having a fixed operative position, the said stop serving to definitely limit the movement of the movable pin in one direction so that it has a definite predetermined operative position, manually operable means carried by the frame for moving the last said pin in the direction away from the said operative position, and means for definitely limiting the last said movement of the pin, the said means being adjustable independently of the first said stop so that the pin has a second operative position at any one of a plurality of definite predetermined distances from the first position.

16. A gauge for determining internal dimensions comprising in combination, a frame, an outward projecting contact pin at one end of the frame, an outward projecting contact pin at the other end of the frame and movable inward or outward with respect thereto, the said frame extending directly along straight lines from one pin to the other, means for moving the movable pin through a definite predetermined distance comprising a manually movable slide mounted in the frame for rectilinear movement transversely of the pin and provided with an inclined cam surface directly engaging the pin, means for changing the extent of slide movement to vary the said predetermined distance of pin movement, and a spring for holding the pin in engagement with the slide.

17. A gauge for determining dimensions comprising in combination, a frame, an adjustable contact pin at one end of the frame, a movable contact pin at the other end of the frame and movable inward or outward with respect thereto, two adjustable screws associated respectively with the two pins and each serving to determine an operative position of the respective pin, means on the frame supplemental to either screw for moving one of the pins away from the position determined by the screw, and means independent of the screws for definitely limiting the last said movement.

18. A gauge for determining dimensions comprising in combination, a frame, a contact pin at one end of the frame, means for adjusting the said pin and locking it in adjusted position, a contact pin at the other end of the frame and movable inward or outward with respect thereto, means for definitely limiting the movement of the movable pin in one direction so that it has a definite predetermined operative position, manually operable means carried by the frame for moving the last said pin in the direction away from the said operative position, and means for definitely limiting the last said movement of the pin, the said means being adjustable independently of the first said limiting means so that the pin has a second operative position at any one of a plurality of definite predetermined distances from the first position.

19. A gauge for determining dimensions comprising in combination, a frame, a contact pin at one end of the frame, means for adjusting the said pin and locking it in adjusted position, a contact pin at the other end of the frame and movable inward or outward with respect thereto, a stop on the frame directly engaging the movable pin and having a fixed operative position, the said stop serving to definitely limit the movement of the movable pin in one direction so that it has a definite predetermined operative position, manually operable means carried by the frame for moving the last said pin in the direction away from the said operative position, and means for definitely limiting the last said movement of the pin, the said means being adjustable independently of the first said stop so that the pin has a second operative position at any one of a plurality of definite predetermined distances from the first position.

20. A gauge for determining internal dimensions comprising in combination, a frame, an outward projecting contact pin at one end of the frame, an outward projecting contact pin at the other end of the frame and movable inward or outward with respect thereto, the said frame extending directly along straight lines from one pin to the other, means for definitely limiting the movement of the movable pin in one direction so that it has a definite predetermined operative position, manually operable means carried by the frame for moving the last said pin in the direction away from the said operative position, and means for definitely limiting the last said movement of the pin, the said means being adjustable independently of the first said limiting means so that the pin has a second operative position at any one of a plurality of definite predetermined distances from the first position.

21. A gauge for determining internal dimensions comprising in combination, a frame, an outward projecting contact pin at one end of the frame, an outward projecting contact pin at the other end of the frame and movable inward or outward with respect thereto, the said frame extending directly along straight lines from one pin to the other, a stop on the frame directly engaging the extreme inner end of the movable pin and having a fixed operative position, the said stop serving to definitely limit the movement of the pin in one direction so that it has a definite predetermined operative position, manually operable means carried by the frame for moving the last said pin in the direction away from the said operative position, and means for definitely limiting the said movement of the pin, the said means being adjustable independently of the first said limiting means so that the pin has a second operative position at any one of a plurality of definite predetermined distances from the first position.

22. A gauge for determining internal dimensions comprising in combination, a frame, an outward projecting contact pin at one end of the frame, means for adjusting the said pin and locking it in adjusted position, an outward projecting contact pin at the other end of the frame and movable inward or outward with respect thereto, the said frame extending directly along straight lines from one pin to the other, means for definitely limiting the movement of the movable pin in one direction so that it has a definite predetermined operative position, manually operable means carried by the frame for moving the last said pin in the direction away from the said operative position, and means for definitely limiting the last said movement of the pin, the said means being adjustable independently of the first said limiting means so that the pin has a second operative position at any one of a plurality of definite predetermined distances from the first position.

In testimony whereof, I hereto affix my signature.

LAWRENCE E. OLSEN.